US006795115B1

United States Patent
Okazaki

(10) Patent No.: US 6,795,115 B1
(45) Date of Patent: Sep. 21, 2004

(54) WHITE-BALANCE ADJUSTING APPARATUS

(75) Inventor: Seishin Okazaki, Ikoma-gun (JP)

(73) Assignee: Sanyo Electric Co., Ltd., Osaka (JP)

(*) Notice: Subject to any disclaimer, the term of this patent is extended or adjusted under 35 U.S.C. 154(b) by 791 days.

(21) Appl. No.: 09/650,637

(22) Filed: Aug. 30, 2000

(30) Foreign Application Priority Data

Aug. 31, 1999 (JP) ........................................ 11-245006

(51) Int. Cl.$^7$ .............................................. H04N 9/73
(52) U.S. Cl. ................... 348/223.1; 348/225; 358/516
(58) Field of Search ........................ 348/207.99, 222.1, 348/223.1, 224.1, 225.1, 229.1, 254, 255, 234; 358/515, 516, 517, 518

(56) References Cited

U.S. PATENT DOCUMENTS

| | | | | |
|---|---|---|---|---|
| 5,319,449 A | * | 6/1994 | Saito et al. ............... | 348/223.1 |
| 5,541,649 A | * | 7/1996 | Yamamoto et al. ...... | 348/223.1 |
| 5,644,359 A | * | 7/1997 | Ito .......................... | 348/223.1 |
| 6,249,317 B1 | * | 6/2001 | Hashimoto et al. ......... | 348/364 |

FOREIGN PATENT DOCUMENTS

| | | |
|---|---|---|
| JP | 5-64221 | 3/1993 |
| JP | 7-162890 | 6/1995 |

* cited by examiner

Primary Examiner—Tuan Ho
(74) Attorney, Agent, or Firm—Westerman, Hattori, Daniels & Adrian, LLP

(57) ABSTRACT

A white-balance adjusting apparatus includes a CPU. The CPU integrates R, G, B and Y signals of a subject image on the basis of each of divisional areas of N in number, to determine integration values Rn, Gn and Bn on primary color components and an integration value Yn on a luminance component. Furthermore, the integration values Rn, Gn and Bn are converted into chrominance components. From the chrominance components, integration values RYn and BYn are determined that are removed of a Y component. Meanwhile, a table is written with a numeral "8" related to a monochromatic color and a numeral "1" related to a skin color. The CPU calculates optimal gains α and β, based on the integration values Rn, Gn and Bn, integration values RYn and BYn and table. The optimal gains are given to the R, G and B signals thereby suppressing the skin color component of the subject image from changing.

6 Claims, 12 Drawing Sheets

FIG. 2

| 14 | Ye | Cy | Ye | Cy | Ye | Cy | . . . | Ye | Cy |
|---|---|---|---|---|---|---|---|---|---|
| | G | Mg | G | Mg | G | Mg | . . . | G | Mg |
| | Ye | Cy | Ye | Cy | Ye | Cy | . . . | Ye | Cy |
| | G | Mg | G | Mg | G | Mg | . . . | G | Mg |
| | . | . | . | . | . | . | | . | . |
| | . | . | . | . | . | . | | . | . |
| | . | . | . | . | . | . | | . | . |
| | . | . | . | . | . | . | | . | . |
| | . | . | . | . | . | . | | . | . |
| | Ye | Cy | Ye | Cy | Ye | Cy | . . . | Ye | Cy |
| | G | Mg | G | Mg | G | Mg | . . . | G | Mg |

| AREA A | AREA B | AREA C | AREA D |
|--------|--------|--------|--------|
| 1 | 2 | 3 | 4 |

| AREA A | AREA B | AREA C | AREA D |
|--------|--------|--------|--------|
| 1 | 8 | 1 | 8 |

| AREA E | AREA F | AREA G |
|--------|--------|--------|
| 0 | 1 | 0 |

34d

| AREA G | AREA H | AREA I | AREA J | AREA K | AREA L |
|--------|--------|--------|--------|--------|--------|
| 1 | 8 | 1 | 8 | 0 | 0 |

WHITE-BALANCE ADJUSTING APPARATUS

BACKGROUND OF THE INVENTION

1. Field of the invention

This invention relates generally to white-balance adjusting apparatuses and, more particularly, to a white-balance adjusting apparatus which provides a certain gain to a color information signal to thereby adjust the white balance.

2. Description of the prior art

FIG. 16 illustrates a color distribution, in which the area represented by hatching (draw-in area) corresponds to a monochromatic color while the outside of the draw-in area to a chromatic color. There is distribution of Mg (magenta) in a first quadrant of a plane defined by the R-Y and B-Y axes. In a second quadrant, R (red) and Ye (yellow) are distributed. In a third quadrant G (green) is distributed, and in a fourth quadrant Cy (cyan) and B (blue) are distributed.

Such color temperature charts have being used in the conventional white-balance adjusting apparatuses applied for digital cameras in order to adjust the white balance in a taken subject image. That is, a taken subject image is first divided into a plurality of partial images, and then a color evaluation value is determined for each of the partial images. Next, activation is made for the color evaluation values included in the draw-in area. Then, the gain is controlled by converging the mean values of the activated color evaluation values to an intersection of the R-Y axis and the B-Y axis.

However, the color evaluation value is varied depending upon a lens opening or shutter speed (exposure amount) during taking a picture. That is, the change of exposure amount also causes change in the amount of light illuminated to the image sensor. According to the color distribution chart of FIG. 16, because the Y signal related to light amount is reflected in the color evaluation value, the color evaluation value is varied due to the exposure amount. Consequently, the conventional digital cameras encounters phenomenon that the color evaluation value with a certain exposure amount exist in the draw-in area to enable proper adjustment of white balance while the color evaluation value with another exposure amount is outside the draw-in area resulting in poor adjustment of white balance.

Meanwhile, where taking a picture of a subject including a human skin, if the color evaluation value on the human skin part is invalidated, the skin color is prevented from changing largely. However, the color evaluation value suffers variation due to the exposure amount as mentioned above. Accordingly, the prior art could not invalidate the color evaluation value only in a human skin part. Consequently, if taking a picture of a subject including much a human skin, the skin in color will possibly turn into pale.

SUMMARY OF THE INVENTION

Therefore, it is a primary object of the present invention to provide a white-balance adjusting apparatus capable of preventing a skin color from turning into another color as effective as possible.

According to the present invention, a white-balance adjusting apparatus for providing an optimal gain to a color information signal corresponding to a subject image to thereby adjust white balance while suppressing a skin color component contained in the color information signal from changing, comprises: a color evaluator for evaluating colors of a predetermined plurality of portions of the subject image based on the color information signal; a luminance evaluator for evaluating luminances of the predetermined plurality of portions based on the color information signal; a remover for removing a plurality of luminance evaluation components given by the luminance evaluator respectively from a plurality of color evaluation components provided by the color evaluator; a table having a first numeral related to a monochromatic color and a second numeral related at least to a skin color; a detector for detecting from the table respective numerals related to the components removed by the remover; and an optimal gain calculator for calculating the optimal gain based on the numerals detected by the detector and the color evaluation components.

The color evaluator evaluates colors in a predetermined plurality of portions of a subject image based on a color information signal corresponding to the subject image, and determines a plurality of color evaluation components. The luminance evaluator evaluates the predetermined plurality of portions based on the same color information signal. The remover removes a plurality of luminance components respectively from a plurality of color evaluation components to determine a plurality of removal components. On the other hand, the table has a first numeral related to a monochromatic color and a second numeral related at least to a skin color. The detector detects, from the table, numerals related respectively to the removal components determined by the removing means. The optimal gain is calculated by the optimal gain calculator, based on the numerals detected by the detector and the color evaluation components. The optimal gain is provided to the color information signal for the subject image, thereby adjusting white balance while suppressing the skin-color component contained in the color information signal from changing.

In one aspect of the invention, the optimal gain calculator first calculates a first gain based on the color evaluation components and then gives weighting to each of the first gain and a predetermined second gain. This provides the optimal gain.

In a preferred embodiment of this aspect, the second gain is always equal to or smaller than the first gain. In the weighting processing, the weighting to the second gain is increased with increase of a ratio of the second numeral to the detected numerals.

In another preferred embodiment of this aspect, when determining the first gain, the removal component related to the monochromatic color and the skin color is specified from among the removal components, and activation is made for the color evaluation component corresponding to the specified removal component. The first gain is calculated based on the activated color evaluation component.

In another aspect of the invention, the second numeral is related also to green.

In another aspect of the invention, the table further has a third numeral related to other colors than the monochromatic color and the skin color. That is, the table has the first, second and third numerals. The first numeral is greater than the second numeral, and the second numeral is greater than the third numeral. A multiplier multiplies the detected numerals respectively by the color evaluation components. The optimal gain is calculated based on a plurality of multiplication values given by the multiplier.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is an illustrative view showing a color filter;

FIG. 6 is an illustrative view showing a draw-in target value table;

FIG. 7 is an illustrative view showing a weighted amount table;

FIG. 8 is an illustrative view showing a draw-in ratio table;

DETAILED DESCRIPTION OF THE PREFERRED EMBODIMENTS

Figure 1:
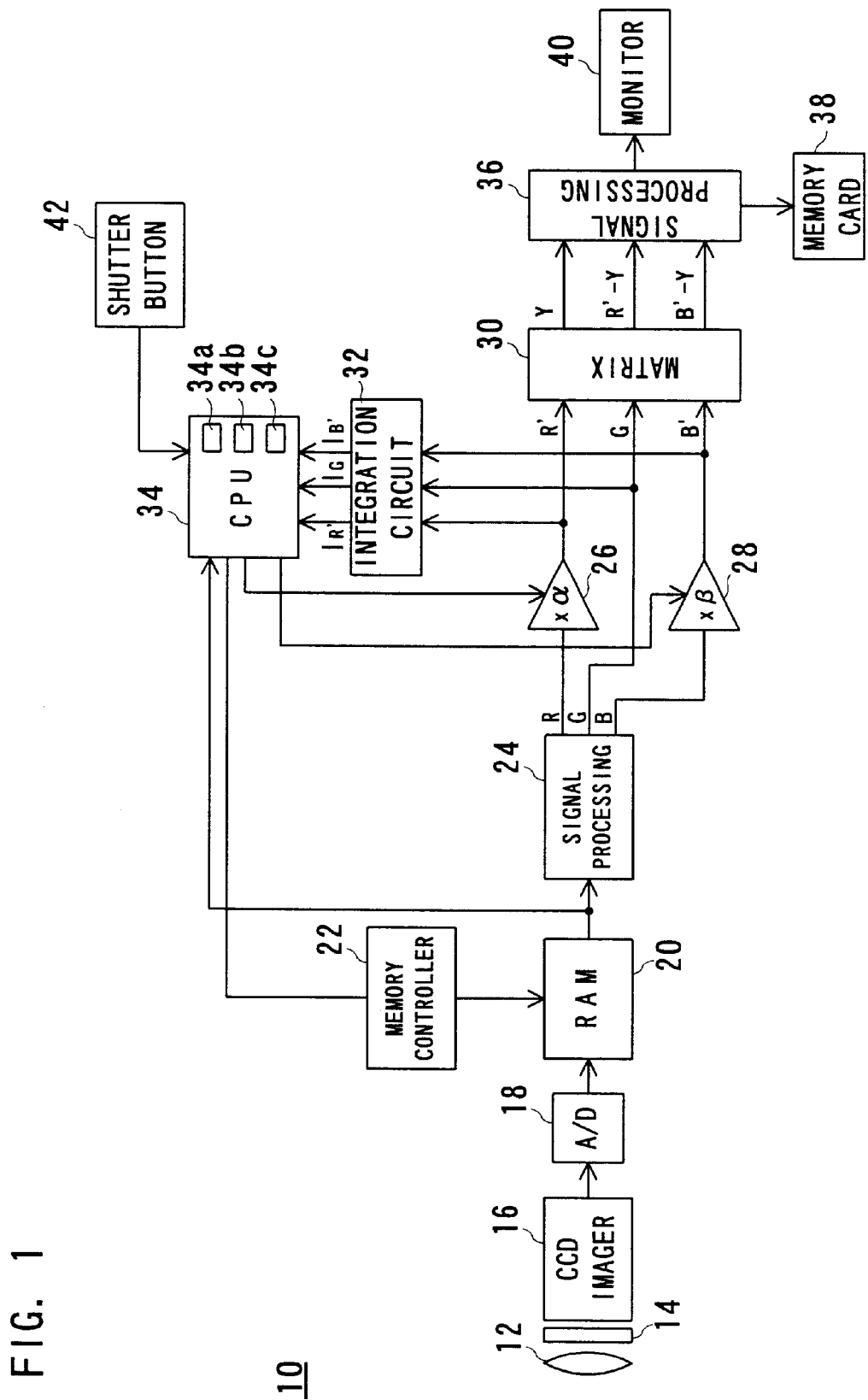
FIG. 1 block diagram showing one embodiment of the present invention.

Referring to FIG. 1, a digital camera 10 of this embodiment includes an optical lens 12. The subject image taken through the optical lens 12 is illuminated through a complimentary color filter 14 to a CCD imager 16. The complimentary color filter 14 possesses filter elements of Ye, Cy, Mg and G, as shown in FIG. 2. One filter element corresponds to one pixel. Consequently, each pixel signal outputted from the CCD imager 16 has only any one of the colors Ye, Cy, Mg and G.

The pixel signals are converted into digital signals, or pixel data, by an A/D converter 18. The pixel data is temporarily stored in a RAM 20 by a memory controller 22.

In a camera mode of displaying a subject motion image in real-time on a monitor 40, the memory controller 22 concurrently executes data writing to the RAM 20 and data reading out of the RAM 20. Due to this, the image data produced by the A/D converter 18 is read, with a delay of 1 frame period, out of the RAM 20. A signal processing circuit 24 produces RGB data from the input pixel data. The pixel data possesses the colors of Ye, Cy, Mg and G, as stated above. Accordingly, the signal processing circuit 24 performs matrix operation on such complimentary-colored pixel data and produces primarycolored pixel data having R, G and B on each pixel.

The R data is multiplied R by an amplifier 26 while the B data is multiplied β by an amplifier 28. That is, a gain α is provided to the R data and a gain β is to the B data. On the other hand, no gain is given to the G data. The R' data and B' data outputted respectively from the amplifiers 26 and 28 and the G data from the signal processing circuit 24 are thereafter subjected to matrix operation, thereby producing luminance data Y and chrominance data R'-Y and B'-Y.

These of data are then outputted onto the monitor 40 through predetermined processing by a signal processing circuit 36. As a result, a through-image is displayed on the monitor screen.

Figure 3:
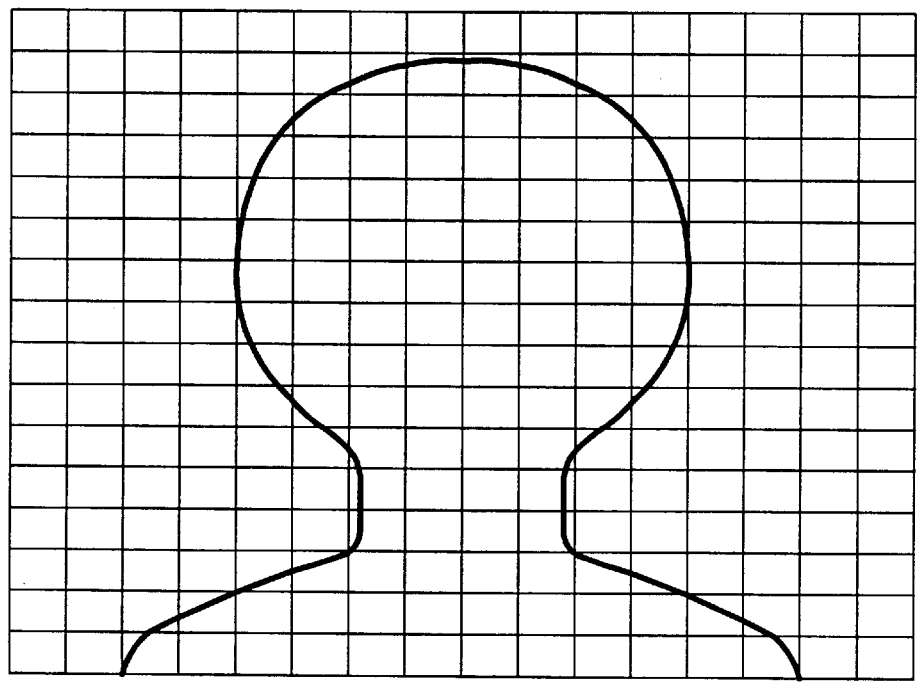
FIG. 3 is an illustrative view showing one example of a subject image and divisional areas formed on the screen.

The R' data, G data and B' data are also inputted to an integration circuit 32. The screen is divided into 16 horizontally and vertically as shown in FIG. 3 to have divisional areas of 256 in number. The integration circuit 32 integrates R' data, G data and B' data on an each-divisional-area basis and on a same-color basis. This provides 256 integration values $I_{R'}$, 256 integration values, $I_G$ and 256 integration values $I_{B'}$ in the 1-frame period. That is, 256 color evaluation values are obtained corresponding to the divisional areas. The CPU 34 controls the gains α and β of the amplifiers 26 and 28 based on the color evaluation values. As a result, a through-image under proper control of white balance is displayed on the monitor 40.

If an operator operates a shutter button 42, the signal processing circuit 24 is disabled. Also, the memory controller 22 suspends the writing of data when the pixel data outputted from the CCD imager 16 has been written to the RAM 20 in response to operation of the shutter button 42. However, reading-out operation is continued. The CPU 34 fetches the pixel data read out of the RAM 20 and sets optical gains α and β to the amplifiers 26 and 28 according to a flowchart shown in FIG. 9 and FIG. 10. That is, the subject image (still image) taken responsive to the shutter button 42 operation is adjusted in white balance according to the flowchart of FIG. 9 and FIG. 10. After completing white-balance adjustment, the signal processing circuit 24 is again enabled. The pixel data read out of the RAM 20 is RGB-converted by the signal processing circuit 24. Thereafter, the optimal gains α and β are provided to R data and B data. The R' data and B' data given the gains α and β as well as the G data outputted from the signal processing circuit 24 are recorded to a memory card 38 through the processing by the signal processing circuit 36.

Figure 9:
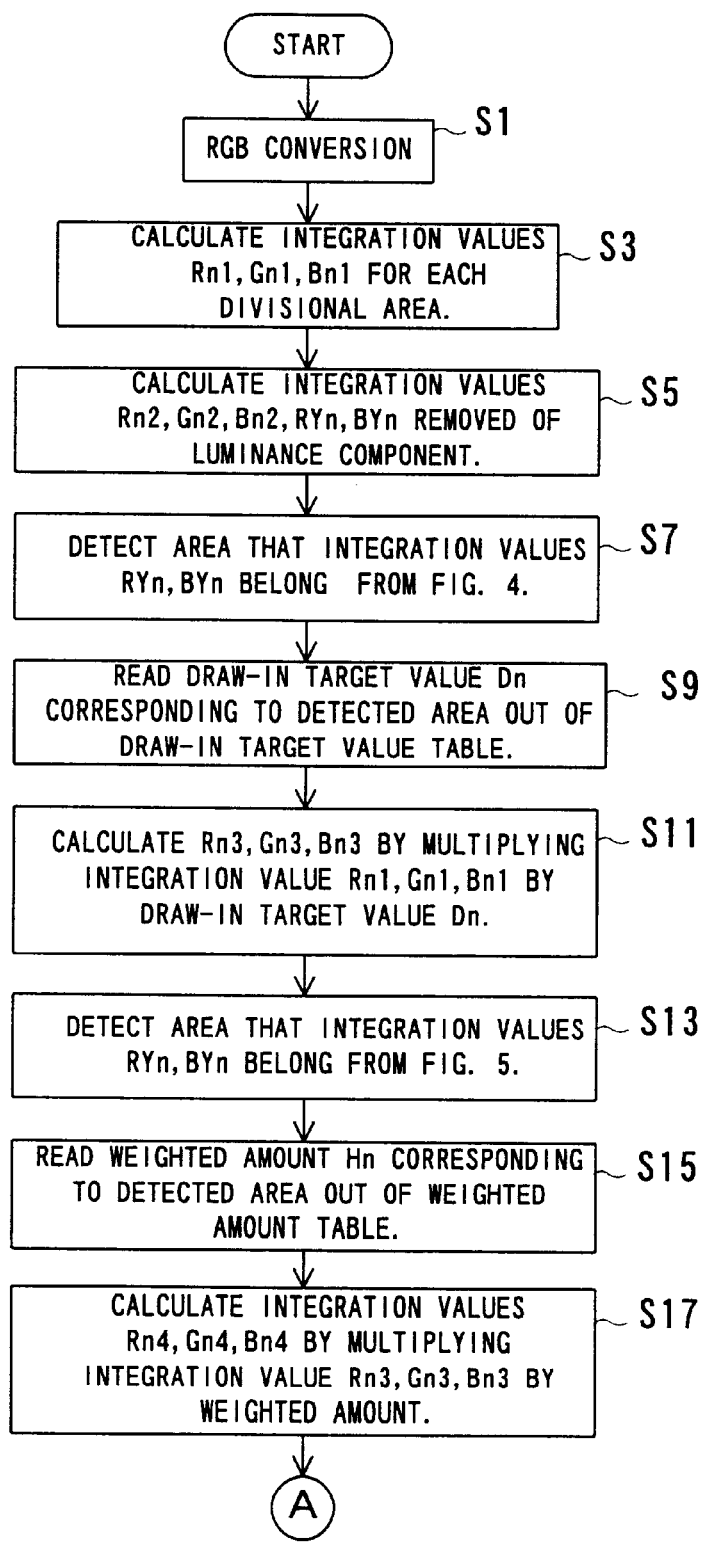
FIG. 9 is a flowchart showing one part of operation of FIG. 1 embodiment.
Figure 10:
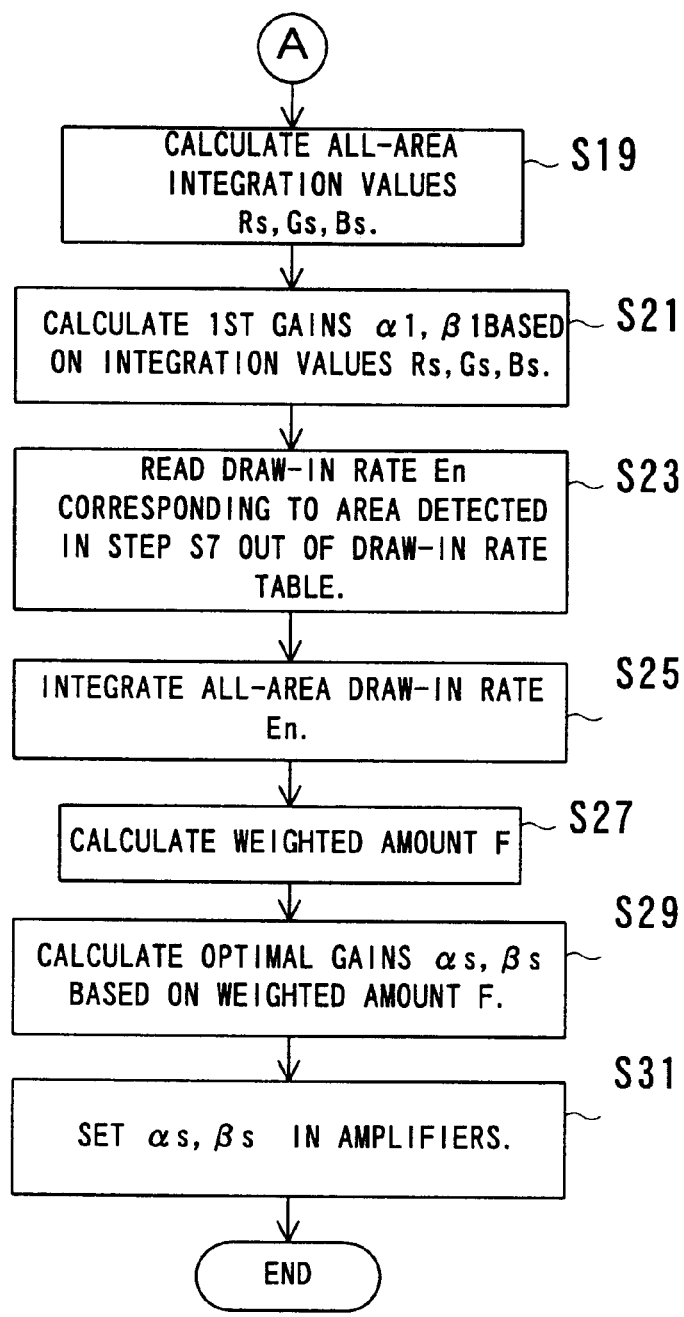
FIG. 10 is a flowchart showing another part of operation of the FIG. 1 embodiment.

Referring to FIG. 9, the CPU 34 first in step S1 performs RGB-conversion on the complimentary-colored pixel data taken from the RAM 20 according to Equation 1, and produces primary-colored pixel data having all the colors R, G and B on each pixel thereof.

$$\begin{bmatrix} R \\ G \\ B \end{bmatrix} = \begin{bmatrix} DRY & DRR & DRB \\ DGY & DGR & DGB \\ DBY & DBR & DBB \end{bmatrix} \begin{bmatrix} Cy \\ Cr \\ Cb \end{bmatrix} \quad \text{[Equation 1]}$$

where Cy=Ye+Mg+Cy+G

Cr=Ye+Mg−(Cy+G)

Cb=Mg+Cy−(G+Ye)

The CPU 34 subsequently advances to step S3, to integrates between the same color of the R data, G data and B data produced in the step S1 on an each-divisional-area basis shown in FIG. 3. That is, the similar processing to that of the integration circuit 32 is executed by software. This provides integration values Rn1 of 256 in number, integration values Gn1 of 256 in number and integration values Bn1 of 256 in number. That is, 256 color evaluation values are obtained corresponding to the divisional areas. Note that "n" represents a divisional area number taking any value of between 0 and 255. Also, FIG. 3 illustrates an image a person (in skin color) taken positioned in front of a white wall (in monochromatic color).

In step S5, Equation 2 is operated to remove luminance component from the integration values Rn1, Gn1 and Bn1.

$Yn1 = 3 \times Rn1 + 6 \times Gn1 + Bn$ $$Rn2=Rn1/Yn1 \times K$$

$$Gn2=Gn1/Yn1 \times K$$

$$Bn2=Bn1/Yn1 \times K$$

$$RYn=(Rn1-Yn1)/Yn1 \times K=Rn2-K$$

$$BYn=(Bn1-Yn1)/Yn1 \times K=Bn2-K \quad \text{[Equation 2]}$$

The integration value Yn1 herein is an integration of luminance data (Y data) in each divisional area shown in FIG. 3. Also, the integration value Rn2, Gn2, Bn2 is a multiplication by a constant K on a division of the integration value Rn1, Gn1, Bn1 by the corresponding integration value Yn1. Furthermore, the integration value Rn1−Yn1, Bn1−Yn1 is an integration of chrominance data R−Y, B−Y in each divisional area shown in FIG. 3. The integration value Ryn, Byn is a multiplication by the constant K on a division of the integration value Rn1−Yn1, Bn1−Yn1 by the corresponding integration value Yn1. The integration value Rn2, Gn2, Bn2 and the integration value RYn, BYn are also color evaluation values corresponding to each divisional area of FIG. 3.

Figure 4:
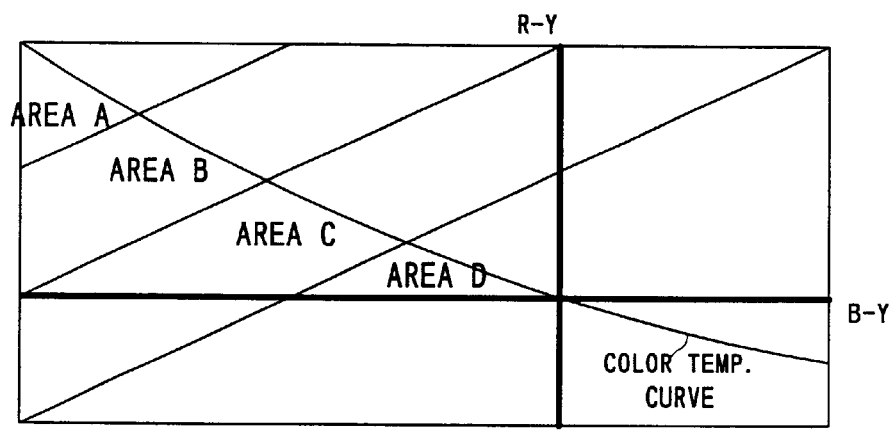
FIG. 4 is an illustrative view showing one part of operation of the FIG. 1 embodiment.
Figure 5:
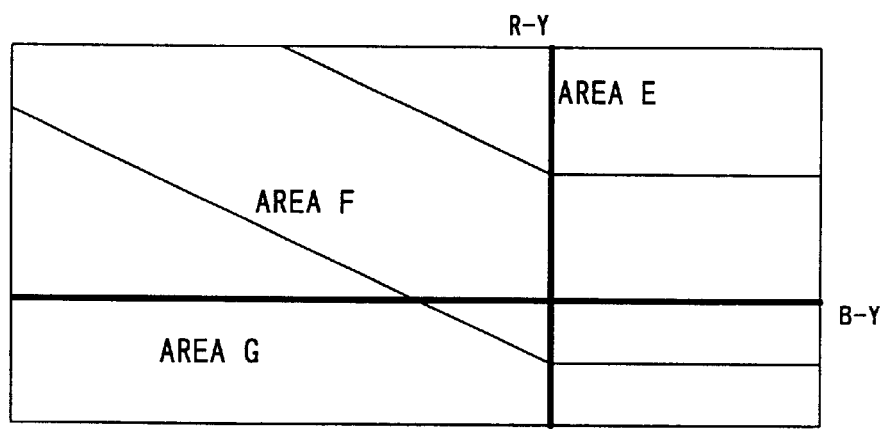
FIG. 5 is an illustrative view showing another part of operation of the FIG. 1 embodiment.

FIG. 4 and FIG. 5 show color distribution charts each having two axes, i.e. R-Y axis and B-Y axis on which reflected is an Y component related to an exposure amount (brightness). Due to this, the integration value Rn1, Gn1, Bn1 and the integration value Rn1−Yn1, Bn1−Yn1 will be varied by an exposure amount even where the subject is a same one. In contrast, the integration values Rn2, Gn2, Bn2 and the integration values RYn, BY are removed of an Y component from the integration value and hence will not be varied as long as the subject is a same one.

After determining the 256 integration values RYn and 256 integration values BYn removed of a luminance component, the CPU 34 proceeds to step S7 to detect an area to which mutually-related integrated values RYn and BYn belong from among a plurality of areas A–D shown in FIG. 4. Thereafter, in step S9, a draw-in target value Dn corresponding to the area detected in the step S7 is read out of a draw-in target value table 34a shown in FIG. 6. After reading out 256 draw-in target values Dn, the CPU 34 in step S11 operates Equation 3 to calculate integration values Rn3, Gn3 and Bn3. That is, the draw-in target values Dn are respectively multiplied by the corresponding integration values Rn1, Gn1, Bn1 to thereby determine 256 integration values Rn3, 256 integration values Gn3 and 256 integration values Bn3. These integration values Rn3, Gn3 and Bn3 are also color evaluation values in each divisional area.

$$Rn3=Rn1 \times Dn$$

$$Gn3=Gn1 \times Dn$$

$$Bn3=Bn1 \times Dn \quad \text{[Equation 3]}$$

According to FIG. 4, the areas A–D are formed such that their boundaries intersect a color temperature curve. Furthermore, the boundaries will not cross a fourth quadrant of a plane defined by the R-Y and B-Y axes. Also, according to FIG. 6, the area A has a draw-in target value of "1" and the area B has a draw-in target value "2", the area C has a draw-in target value "3", and the area D has a draw-in target value "4". That is, the numeral increases as going from the area A toward the area D. Consequently, the draw-in degree increases as a value represented by RYn and BYn approaches an intersection of the R-Y axis and B-Y axis (e.g. a color temperature of 550 K; reference color temperature).

In step S13, an area to which the integration values RYn and BYn belong is detected from among a plurality of areas E–G shown in FIG. 5. In the following step S15, a weighted amount Hn corresponding to the detected area is read out of a weighted amount table 34c shown in FIG. 8. After reading out weighted amounts Hn of 256 in number, the CPU 34 in step S17 operates Equation 4 to calculate integration values Rn4, Gn4 and Bn4. According to Equation 4, the respective weighted amounts Hn are multiplied by the integration values Rn3, Gn3 and Bn3 determined in the step S13, thereby determining 256 integration values Rn4, 256 integration values Gn4 and 256 integration values Bn4. These integration values Rn4, Gn4 and Bn4 are also color evaluation values in each divisional area.

$$Rn4=Rn3 \times Hn$$

$$Gn4=Gn3 \times Hn$$

$$Bn4=Bn3 \times Hn \quad \text{[Equation 4]}$$

Figure 16:
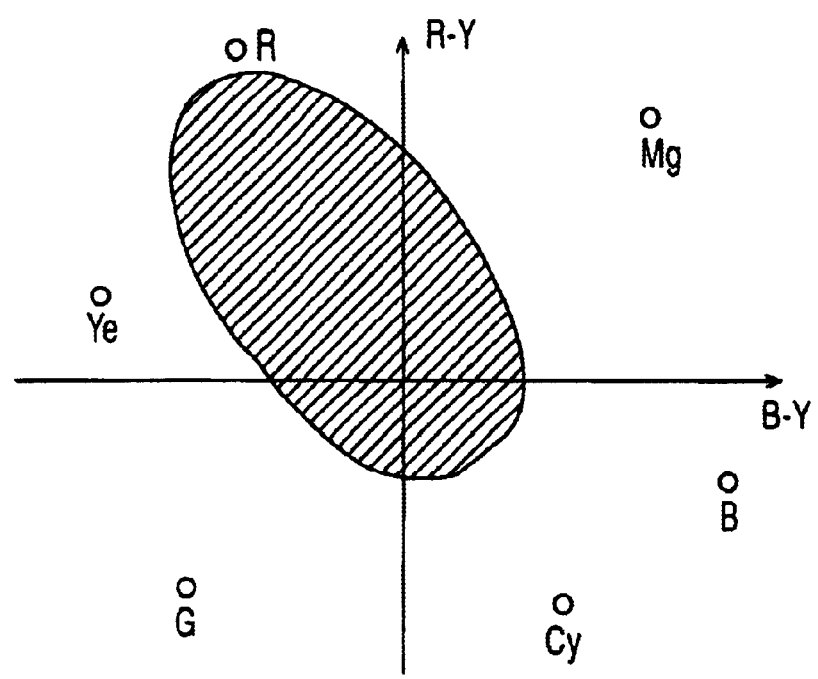
FIG. 16 is an illustrative view showing one part of operation of the prior art.

Referring to FIG. 5, the areas E and G are assigned to a chromatic portion while the area F is to a monochromatic portion. The area F includes skin color analogous to a monochromatic color. As will be understood from FIG. 8, the areas E and G have a weighted amount of "0" and the area F has a weighted amount of "1". Accordingly, among the 256 integration values Rn3, Gn3 and Bn3, activated are only those corresponding to the integration values RYn and BYn belonging to the area F. Note that the area F corresponds to the draw-in area shown in FIG. 16.

In step S19, the integration values Rn4, Gn4 and Bn4 determines according to Equation 4 are added together on a same-color-component basis thereby calculating integration values Rs, Gs and Bs over the entire screen shown in FIG. 3. Thereafter, in step S21 Equation 5 is operated, to determine first gains α1 and β1 based on the integration values Rs, Gs and Bs.

$$\alpha 1=Gs/Rs$$

$$\beta 1=Gs/Bs \quad \text{[Equation 5]}$$

The CPU 34 subsequently advances to step S23 to read a draw-in ratio En corresponding to the area detected in the step S7 out of a draw-in ratio table 34b. Then, in step S25 is determined a sum Es of the divisional-area draw-in ratios En. In step S27, a weighted amount F is determined according to Equation 6.

$$F=Es/(8 \times 256) \quad \text{[Equation 6]}$$

According to FIG. 7, a maximum draw-in ratio is "8". Consequently, the operation of Equation 6 provides a ratio of sum Es to a maximum sum "2048". This ratio is given as a weighted amount F. Meanwhile, according to same FIG. 7, the areas A and C have a draw-in ratio "1" while the areas B and D have a draw-in ratio "8". Accordingly, the weighted amount F increases in value with increase of the integration values RYn and BYn included in the areas B and D. Conversely, the weighted amount F decreases in value with increase in the integration values RYn and BYn included in the areas A and C.

If a subject is taken under a light source at 3000K (e.g. incandescent lamp), the integration values RYn and BYn of a portion in a skin color analogous to a monochromatic color are included in the area A. Also, if the subject is taken under a light source at 5000K (e.g. solar light or fluorescent lamp), the integration values RYn and BYn of the same portion in the same skin color are included in the area C. Furthermore, because the areas A–D are formed as shown in FIG. 4, when trees and plants are shot under a light source at 3000K or 5000K, the integration values RYn and BYn of the trees-and-plants portion are respectively included in the areas A and C. Accordingly, the ratio determined by Equation 6 relate to a ratio of the skin and trees-and-plants (green) colors to a subject image.

The CPU 34 thereafter in step S29 operates Equation 7, to calculate optimal gains αs and βs based on the weighted amount F. According to Equation 7, first gains α1 and β1 are multiplied by the weighted amount F and second gains α2 and β2 (each having an initial value "1") are multiplied by "1–F". The determined optimal gains αs and βs respectively assume values of between the first gains α1 and β1 and the initial values "1" and "1".

$$\alpha s=(1-F)\times 1+FX\times \alpha 1$$

$$\beta s=(1-F)\times 1+FX\times 1 \qquad \text{[Equation 7]}$$

After calculating the optimal gains αs and βs in this manner, the CPU 34 in step S31 sets the optimal gains αs and βs respectively to the amplifiers 26 and 28 and then finishes the processing.

According to this embodiment, integration values RYn and BYn removed of the Y component are first determined based on the integration values Rn1, Gn1 and Bn1 and the integration value Yn. Subsequently, an area to which the integration values RYn and BYn belong is detected from the color distribution chart of FIG. 4. From a draw-in target value Dn (taking any value of 1 to 4) corresponding to the detected area and the integration values Rn1, Gn1 and Bn1, integration values Rn3, Gn3 and Bn3 are determined. Due to this, the closer the integration values RYn and BYn are to an intersection of the R-Y and B-Y axes, the greater values the corresponding integration values Rn3, Gn3 and Bn3 take.

Also, an area to which the integration values RYn and BYn belong is detected from the color distribution chart of FIG. 5. Integration values Rn4, Gn4 and Bn4 are determined based on a weighted amount Hn (taking a value of 0 or 1) corresponding to the detected area and on the integration values Rn3, Gn3 and Bn3. Due to this, only the integration values Rn3, Gn3 and Bn3 are made effective that correspond to the integration values RYn and BYn belonging to the area F. Thus, obtained are total integration values Rs, Gs and Bs of the integration values Rn4, Gn4 and Bn4. First gains α1 and β1 are calculated from the integration values Rs, Gs and Bs.

On the other hand, a weighted amount F is determined based on a draw-in ratio En (taking a value of 1 or 8) corresponding to the area detected in the color distribution chart of FIG. 4. Optimal gains αs and βs are calculated based on the weighted amount F, first gains α1 and β1 and second gains α2 and β2. When taking a picture of a person under a light source at any of 3000K and 5000K, the draw-in ratio for the skin part corresponding to the integration values RYn and BYn assumes "1". Consequently, the more a subject image contains a skin color, the smaller the weighted amount F is. Thus, the optimal gains αs and βs approximate to the second gains α2 and β2.

The optimal gains αs and βs are respectively set in the amplifiers 26 and 28 to adjust the white-balance of the subject image. Accordingly, it is possible to prevent a skin color contained in a subject from turning into another color as less as possible.

Figure 11:
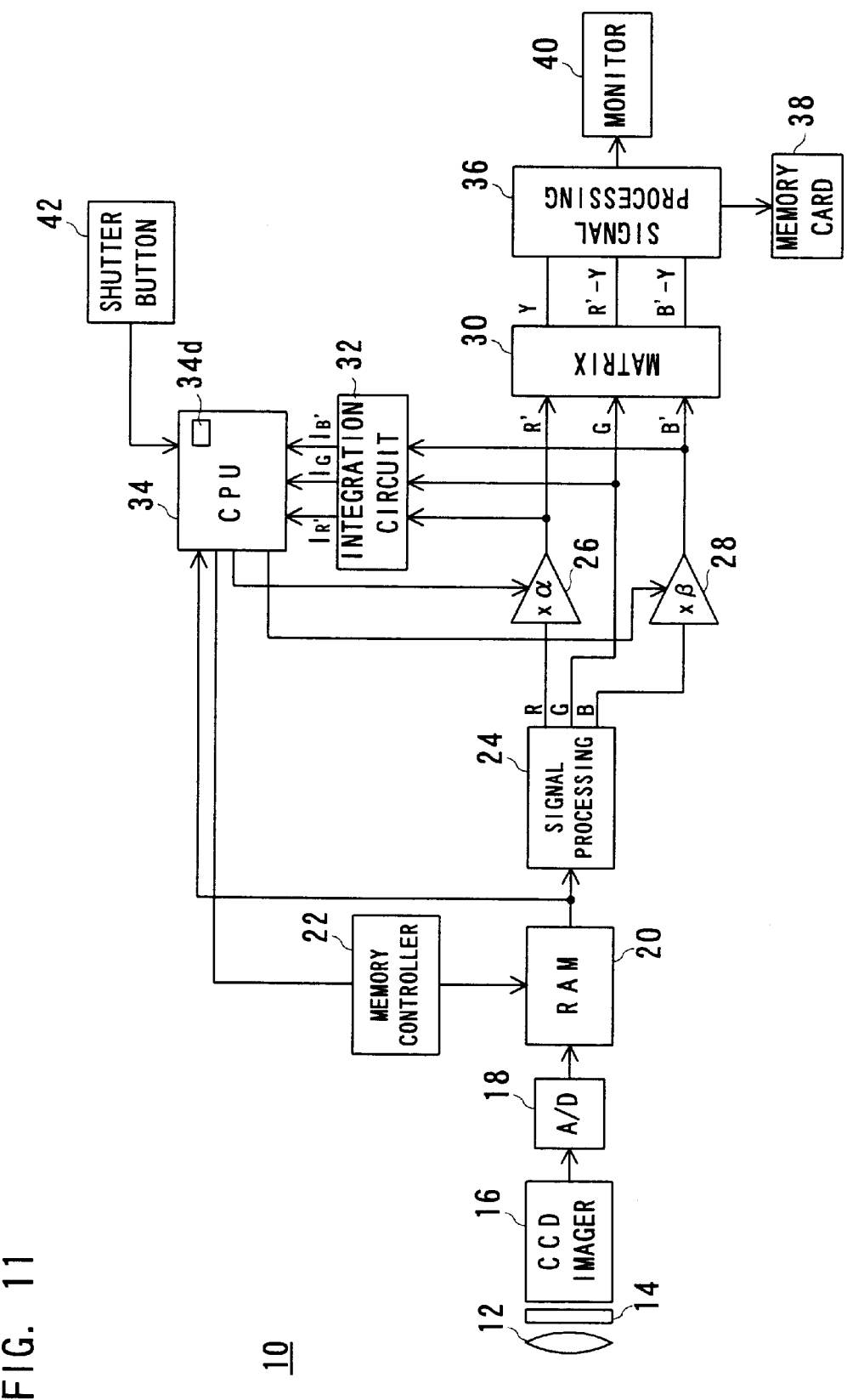
FIG. 11 is a block diagram showing another embodiment of the invention.
Figure 14:
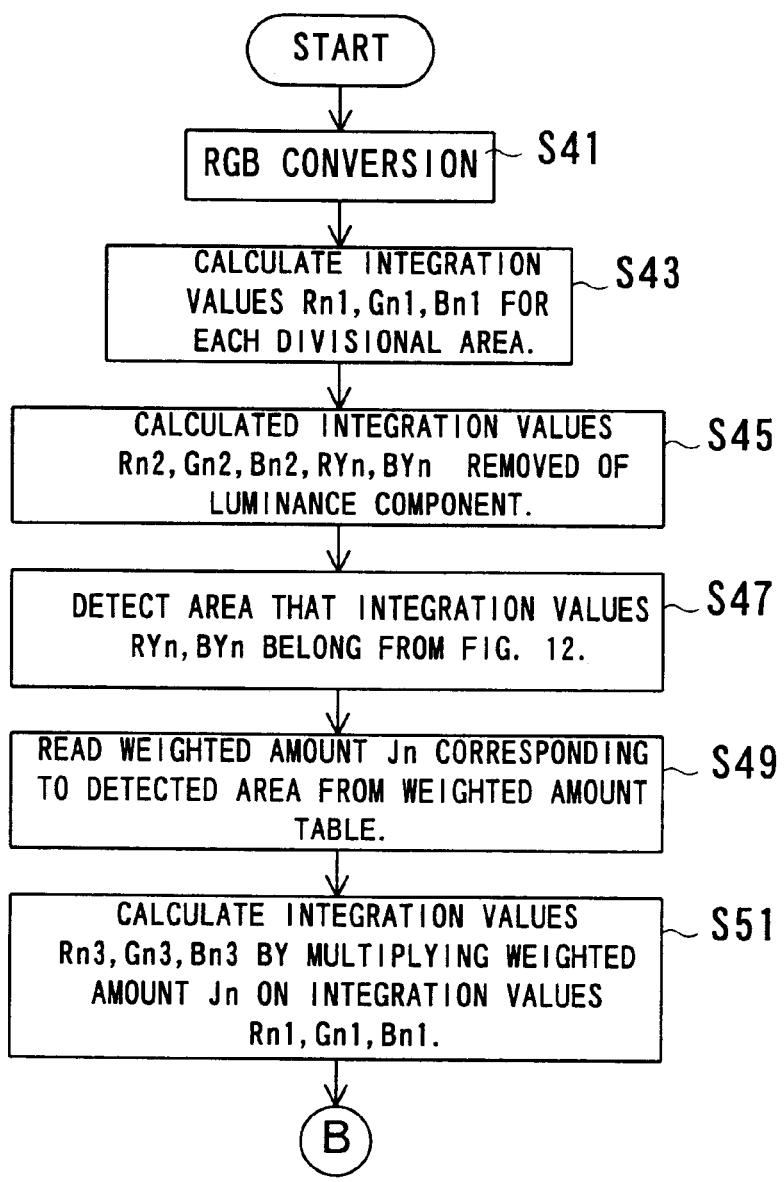
FIG. 14 is a flowchart showing another part of operation of the FIG. 11 embodiment.
Figure 15:
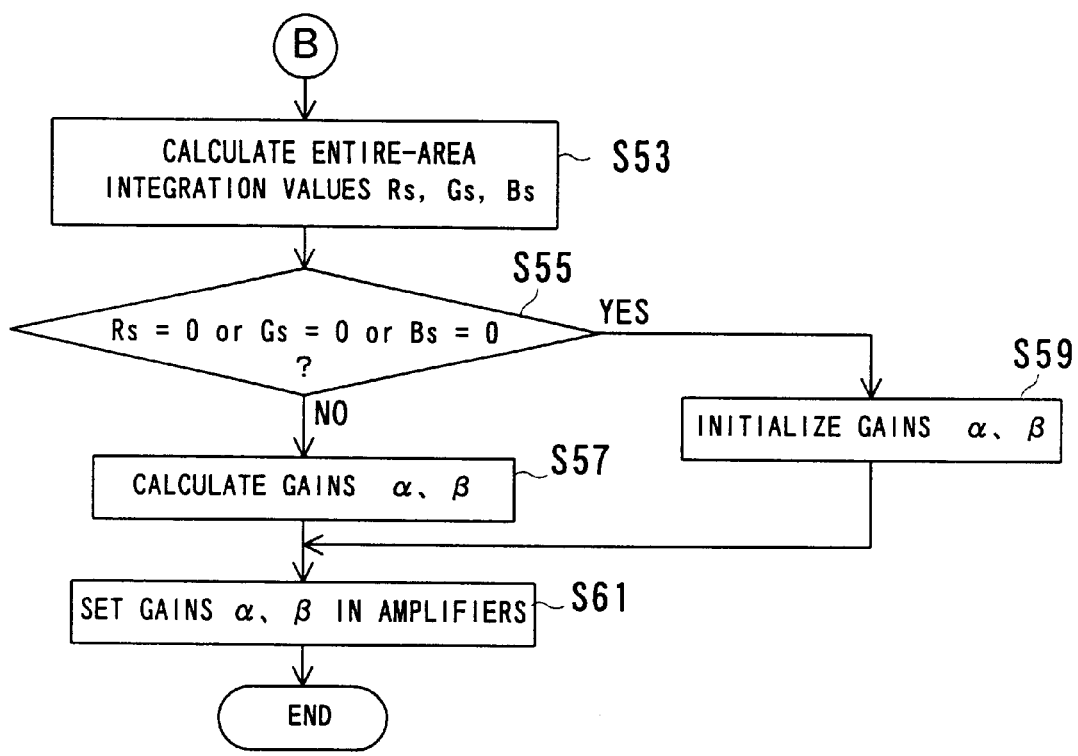
FIG. 15 is a flowchart showing still another part of operation of FIG. 11 embodiment.

Referring to FIG. 11, a digital camera 10 of another embodiment is similar to that of the FIG. 1 embodiment excepting that the CPU 34 processes a flowchart shown in FIG. 14 and FIG. 15. Hence, duplicated explanations are omitted as much as possible. Incidentally, the CPU 34 fetches pixel data out of the RAM 20 in response to operation of the shutter button 42 and sets optimal gains α and β respectively in the amplifier 26 and 28 according to the flowchart of FIG. 14 and FIG. 15.

The CPU 34 first in steps S41–S45 performs processing similar to that of the above steps S1–S5, to determine integration values Rn2, Gn2 and Bn2 and integration values RYn and BYn each of which is 256 in number. Subsequently, in step S47, an area that the integration values RYn and BYn belong is detected with reference to the color distribution chart shown in FIG. 12. After detecting areas of 256 in number, the CPU 34 advances to step S49 to read a weighted amount Jn corresponding to each detected area out of a weighted amount table 34d shown in FIG. 13. Then, in step S49 Equation 8 is operated to determine integration values Rn3, Gn3 and Bn3 based on the integration values Rn1, Gn1 and Bn1 and the corresponding weighted amount Jn.

$$Rn3=Rn1\times Jn$$

$$Gn3=Gn1\times Jn$$

$$Bn3=Bn1\times Jn \qquad \text{[Equation 8]}$$

Figures 12, 13:
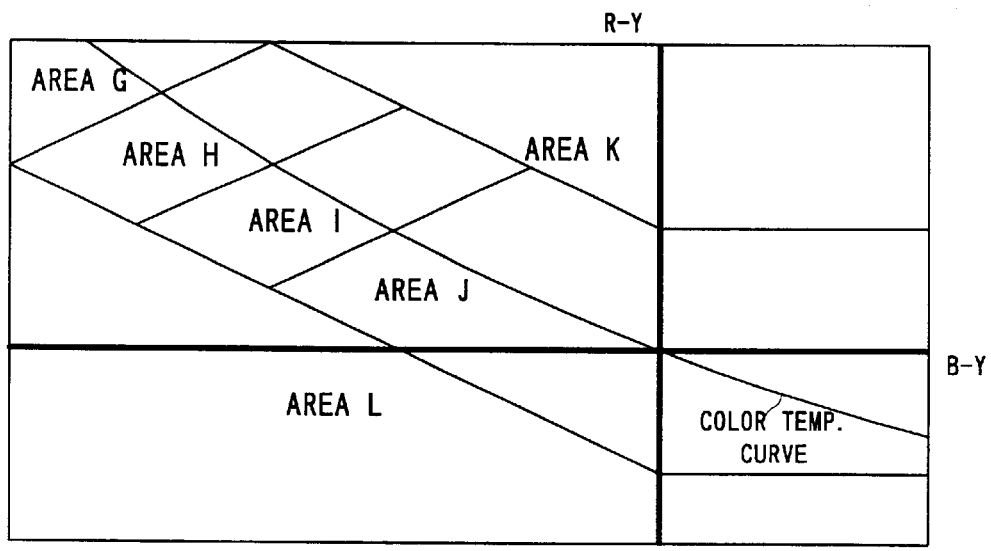
FIG. 12 is an illustrative view showing one part of operation of the FIG. 11 embodiment.
FIG. 13 is an illustrative view showing a weighted amount table.

According to FIG. 12, areas K and L are assigned to the regions corresponding to chromatic colors and areas G–J are to the regions corresponding to monochromatic and skin colors. The areas G–J have their boundary lines drawn in the second quadrant such that they intersect the color temperature curve. Meanwhile according to FIG. 13, the areas K and L have a weighted amount "0", the areas G and I a weighted amount "1", and the areas H and J a weighted amount "8". Consequently, where the integration values RYn and BYn belong to the areas K and L, the corresponding integration values Rn1, Gn1 and Bn1 to the integration values RYn and BYn are made invalid. Meanwhile, when the integration values RYn and BYn belong to the areas G and I, the corresponding integration values Rn1, Gn1 and Bn1 are multiplied by "1". When the integration values RYn and BYn belong to the area H or J, the corresponding integration values Rn1, Gn1 and Bn1 are multiplied by "8".

Similarly to the FIG. 1 embodiment, if a subject is taken under a light source (e.g. incandescent lamp) at 3000K, the integration values RYn and BYn on a skin-colored part are included in the area G. If the subject is taken under a light source (e.g. solar light or fluorescent lamp) at 5000K, the integration values RYn and BYn of the same skin-colored part are in the area I. Accordingly, even when taking a picture under a light source at any of the color temperatures, the weighted amount corresponding to the skin-colored part is "1".

The CPU 34 subsequently in step S53 integrates the integration values Rn3, Gn3 and Bn3 on a same-color-component basis throughout the entire screen, thereby determining integration values Rs, Gs and Bs. That is, addition is individually made for the 256 integration values Rn3, the 256 integration values Gn3 and the 256 integration values Bn3, thereby calculating total integration values Rs, Gs and Bs.

Step S55 determines as to values on the integration values Rs, Gs and Bs obtained. If any one of the integration values Rs, Gs and Bs is "0", the CPU advances to step S59 to initialize the gains α and β. Because in Equation 8 the mutually-related integration values Rn1, Gn1 and Bn1 is multiplied by a same weighted amount Jn, the step S55 may determine whether any one of the integration values Rs, Gs and Bs is "0" or not. In any case, where the integration values RYn and BYn of 256 in number are all included in the area K or L, determination is as "YES" in the step S55 thereby initializing the gains α and β.

On the contrary, if "NO" is determined in the step S55, the CPU 34 proceeds to step S57 to calculate gains α and β according to Equation 9.

$$\alpha = Gs/Rs$$

$$\beta = Gs/Bs$$

Determining gains α and β (optimal gains) in this manner, the CPU 34 in step S61 sets the optimal gains α and β respectively to the amplifiers 26 and 28 thus ending the processing.

According to this embodiment, a weighted amount Jn is determined according to the color distribution chart of FIG. 12 and the weighted amount table of FIG. 13, and the determined weighted amount Jn is multiplied on the corresponding integration values Rn1, Gn1 and Bn1. Here, because the weighted amount table 34*d* has values of "0", "1" and "8", the step S51 collectively completes the processing of invalidating the chromatic-colored part as well as the processing of reducing the weighting on a skin-colored part smaller than that of a monochromatic-colored part. The optimal gains α and β calculated through the above processing are respectively set in the amplifiers 26 and 28. This adjusts the white-balance of a subject image to thereby prevent the skin color contained in the subject image from turning into another color as less as possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A white-balance adjusting apparatus for providing an optimal gain to a color information signal corresponding to a subject image thereby adjusting white balance while suppressing a skin color component contained in the color information signal from changing, comprising:

a color evaluator for evaluating colors of a predetermined plurality of portions of the subject image based on the color information signal;

a luminance evaluator for evaluating luminances of the predetermined plurality of portions based on the color information signal;

a remover for removing a plurality of luminance evaluation components given by said luminance evaluator respectively from a plurality of color evaluation components provided by said color evaluator;

a table having a first numeral related to a monochromatic color and a second numeral related at least to a skin color;

a detector for detecting from the table respective numerals related to the components removed by said remover; and an optimal gain calculator for calculating the optimal gain based on the numerals detected by said detector and the color evaluation components.

2. A white-balance adjusting apparatus according to claim 1, wherein said optimal gain calculator includes a first gain calculator to calculate a first gain based on the color evaluation components and a weighter to give weighting to each of the first gain and a predetermined second gain based on the detected numerals and determine the optimal gain.

3. A white-balance adjusting apparatus according to claim 2, the second gain is always equal to or smaller than the first gain, and the weighter increasing the weighting to the second gain with increase of a ratio of the second numeral to the detected numerals.

4. A white-balance adjusting apparatus according to claim 2, wherein said first gain calculator includes a specifier to specify the removal component related to the monochromatic color and the skin color from among the removal components, an activator to activate the color evaluation component corresponding to the removal component specified said specifier, and a calculator to calculate the first gain based on the color evaluation component activated by said activator.

5. A white-balance adjusting apparatus according to claim 1, wherein the second numeral is related also to green.

6. A white-balance adjusting apparatus according to claim 1, wherein the table further has a third numeral related to other colors than the monochromatic color and the skin color, the first numeral being greater than the second numeral, the second numeral being greater than the third numeral, and said optimal gain calculator including a multiplier to multiply the detected numerals respectively by the color evaluation components and a calculator to calculate the optimal gain based on a plurality of multiplication values given by said multiplier.

* * * * *